United States Patent
Veroman et al.

[15] 3,673,372
[45] June 27, 1972

[54] COPYING SYSTEM FOR CUTTING OUT ARTICLES OF COMPLEX SHAPE BY THE ELECTROEROSION METHOD

[72] Inventors: Viktor Jurievich Veroman, ulitsa Soldata korzuna, 3, kv. 159; Vladimir Alexeevich Rozanov, Tikhoretsy prospekt, 9, korpus 8, kv. 74; Mikhail Yakovlevich Rabinovich, ulitsa Rustaveli, 18, kv. 40, all of Leningrad, U.S.S.R.

[22] Filed: June 7, 1971
[21] Appl. No.: 150,397

[52] U.S. Cl. .................................................... 219/69 V
[51] Int. Cl. ............................................................ B23p 1/12
[58] Field of Search ................................... 219/69 G, 69 V

[56] References Cited

UNITED STATES PATENTS 3,614,372  10/1971  Dulebon et al. ................. 219/69 E

*Primary Examiner*—R. F. Staubly
*Attorney*—Waters, Roditi, Schwartz & Nissen

[57] ABSTRACT

A copying system for cutting out articles of complex shape by the electroerosion method, which for the purpose of using enlarged drawings as master-forms has a traverse that swings about an axis passing through one end thereof, and carries an electrode-tool, its other end carrying a pickup, the traverse being swung by one of the drives of the tracing system. The copying system also has a supplementary carriage moved by the second drive of the tracing system, and connected to the board of the master-form by means of a flexible tie, while its connection with the carriage whereon secured is the working table, is realized through a sine converter disposed on said supplementary carriage and capable of regulating its angle of inclination.

1 Claim, 1 Drawing Figure

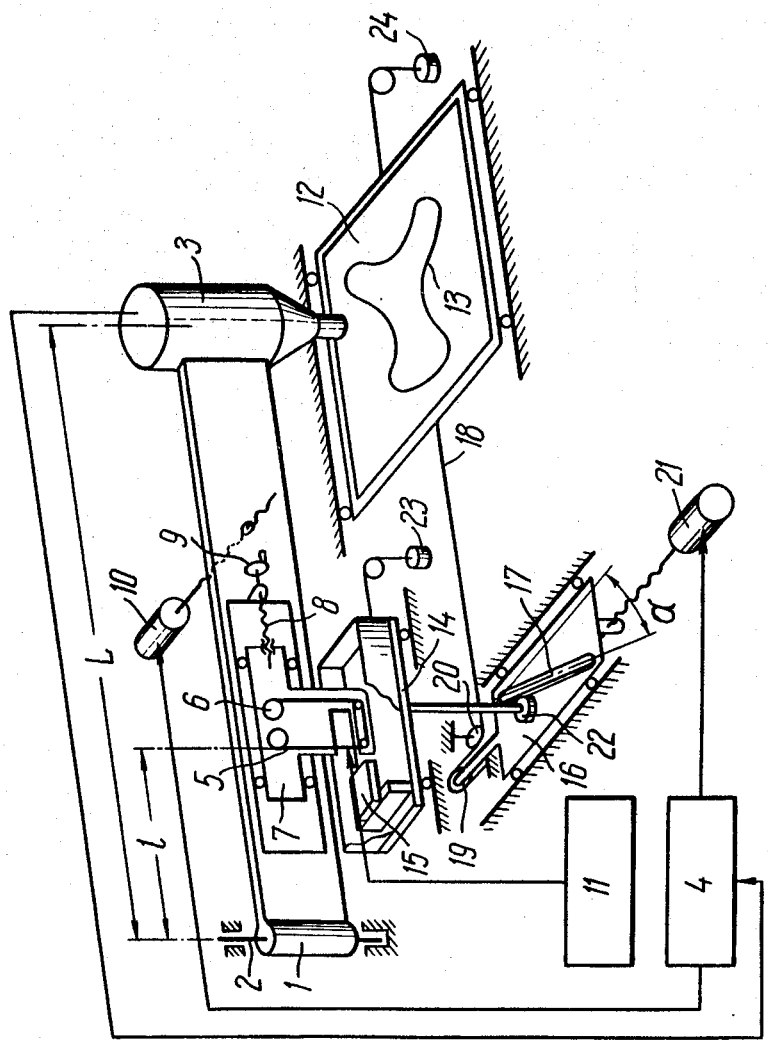

COPYING SYSTEM FOR CUTTING OUT ARTICLES OF COMPLEX SHAPE BY THE ELECTROEROSION METHOD

The invention relates to equipment for electroerosion working, and more specifically to copying systems for cutting out articles of complex shape by the electroerosion method.

The invention can be used to produce articles with a cylindrical generatrix and having any shape, however complex, from ordinary metals, i.e. brass, copper, aluminum, steel, etc., as well as from hard-to-work metals and alloys, chilled and alloy steels, hard alloys, tungsten, molybdenum, titanium, etc.

A copying system for electroerosion cutting of articles of complex configuration permits manufacturing templets and patterns for checking turbine blades and pressing dies, male and female blanking dies, profiled tools, cutters, and other components whose production by the ordinary methods is either difficult, or impossible. The copying system for cutting out intricate articles by the electroerosion method is employed in the tool shops of almost every industry, as well as in instrument making, radio engineering, jewelry, and other industries.

The basic principle of operation of a copying system to cut out articles of complex shape by the electroerosion method consists in cutting out a component from a solid blank using a thin wire electrode-tool, the movement of the latter being determined either by a present program, or by a given master-form. Known in the art are machines with a program-controlled following of the contour being cut, wherein the program of movement is set in the form of punched tapes or cards.

Also known are copying cutting machines, wherein movement along the specified contour is realized manually by the operator, or automatically, following a metal or photosensitive master-forms made to a scale of 1:1 with respect to the job.

In the copying systems for electroerosion cutting of articles of complex shape in copying cutting machines, the electric signal from the pickup that traces the contour of the master-form arrives at a tracing system with two drives, which move in a mutual proportion a board with the master-form and a carriage with the working table secured thereon.

The main disadvantage of the program-controlled machines consists in the significant labor consumption required to design the programs, which calls for skilled engineering and technical personnel of designers. Exploitation of program-controlled machines is quite expensive, and can repay itself only in large-scale production. Their cost is very high.

The main disadvantage of the copying cutting machines is the large labor consumption to make the metal or photosensitive master-forms. To produce the master-forms, specialists of precision pattern-making work must be employed, and special technology, as well as precision machines and special equipment, used. When the article has a very complex configuration it turns out altogether impossible making a master-form that equals the article in size.

An object of the invention is to provide a copying system for electroerosion cutting of articles of intricate shape, that would enable using master-forms made to an enlarged scale.

Another object of the invention is to devise a copying system, that would be simple in its servicing and its production.

The idea of the invention consists in that a copying system for cutting out articles of complex shape by the electroerosion method, wherein the electric signal from the pickup tracing the contour of the master-form arrives at a tracing system with two drives which move in a mutual proportion a board with the master-form and a carriage with a working table secured thereon, according to the invention, has a traverse that swings about an axis passing through one end thereof, and carries an electrode-tool, its other end carrying said pickup, and the traverse being swung by one of the drives of the tracing system, and also has a supplementary carriage moved by the second drive of the tracing system, and connected to the board of the master-form by means of a flexible tie, while its connection to the carriage whereon secured is the working table, is realized through a sine converter disposed on said supplementary carriage and capable of regulating its angle of inclination, whereas serving as the master-form is an enlarged drawing.

Such a design of the copying system permits using drawn master-forms, and producing components of complex configuration that would be otherwise impossible to make. Besides, the accuracy of cutting work is raised, since the requirements for the accuracy of the enlarged drawn master-form are reduced as many times, as the drawn master-form is enlarged. This is why drawn master-forms can be made by low-skill workers.

Since the copying system for electroerosion cutting of articles of complex shape moves along the drawn master-form automatically, without human participation, this permits employing therewith low-skill operators.

The invention is further explicated by the description of an illustrative embodiment thereof, and by the appended drawing which shows the copying system according to the invention.

The copying system for electroerosion cutting of articles of complex shape is employed in electroerosion machines, and realizes the cutting process by the method of using a wire electrode-tool that copies the outlines of a drawing made to an enlarged scale. Used in this system is movement in a mixed polar-linear frame of axes, wherein continuous following of the outlines of a drawing of any degree of complexity can be achieved.

According to the invention, the copying system has a traverse 1 swinging about a pivot 2, and constituting a lever of the second kind.

Secured at the end of the traverse is a pickup 3 of a tracing system 4. A wire electrode-tool 5 together with a winding system 6 are fixed on a carriage 7 which is capable of moving along traverse 1 by means of a screw 8 and a handle 9. The angular movement of traverse 1 is done by a drive consisting of a feeding electric motor 10 which is actuated by the tracing system 4. Current pulses are supplied to the electrode-tool 5 from a pulse generator 11.

Thus, the scale of the radius value in the polar-linear system of coordinates is determined by the position of the axis of the electrode-tool 5 (i.e. of carriage 7) with respect to the rotation axis 2 of traverse 1, and is checked by measuring scaled means (not shown in the drawing).

In this case the scale factor will be $$M_P = L/l,$$

where $M_R$ is scale factor of the angle coordinate;

$L$ is the distance between the rotation axis 2 of traverse 1 and the axis of pickup 3;

$l$ is the distance between the rotation axis 2 of traverse 1 and the axis of the electrode-tool 5;

Linear displacement in scale, of a board 12 with the drawing 13, and of the working carriage 14 whereon fixed is the blank 15, is realized by means of a supplementary carriage 16 located on which is a sine converter in the form of a sine bar 17. The supplementary carriage 16 is connected to board 12 by a flexible tie in the form a rope 18 through a pulley system 19 and 20.

The supplementary carriage 16 is driven by an electric motor 21 which is also actuated by the tracing system 4, this carriage moving in a direction perpendicular to the direction of movement of board 12 and the working carriage 14.

The supplementary carriage 16 is connected with the working carriage 14 through a roller 22 secured on carriage 14 and leaning against the working surface of bar 17 to which it is pressed by means of a weight 23. Tension of rope 18 and closure of plays in the system are achieved by means of a weight 24.

The scale of linear displacement of the working carriage 14 relative to board 12 with drawing 13 is determined by the angle of inclination $\alpha$ of bar 17 with respect to the line of movement of the supplementary carriage 16. For the case of the arrangement of rope 18 as shown in the diagram, the scale factor of the longitudinal coordinate $M_l$ will be $$M_1 = 1/2 \, tg \, \alpha,$$
where 2 is the reduction ratio of the system of pulleys 19 and 20.

Automatic movement along the line of drawing 13 is accomplished by means of a conventional tracing system 4 which controls the feed motors 10 and 21 so, that the line of drawing 13 continuously passes under the objective of pickup 3. The combined effect of the swinging of traverse 1 and the linear displacement of board 12 provides for accordingly (i.e. $M_R$ and $M_l$ times) reduced swinging of the axis of the electrode-tool 5 and linear displacement of the working carriage 14 with blank 15, as a result of which cut out from blank 15 by the electroerosion method is the required figure reduced $M_R$ and $M_1$ times as compared to the drawn master-form 13. To maintain similarity of drawing 13 with the article being cut out, the following condition should be observed:
$$M_R = M_1$$
The copying system functions as follows.

The geometrical position of the line of drawing 13 is by means of the electronic-optical pickup converter 3 converted into an electric signal with phase modulation. This signal arrives at the electronic tracing system 4 wherefrom, after a series of transformations and amplification, it is sent to the feed motors 10 and 21 which swing traverse 1 with the wire electrode-tool 5 about pivot 2, and move the supplementary carriage 16. Bar 17 disposed on carriage 16 at an angle to its direction of movement presses against the driving roller 22, thus bringing into movement the working carriage 14 with blank 15 fixed thereon. At the same time the supplementary carriage 16 through pulleys 19 and 20 and rope 18 transmits motion to board 12 with drawing 13.

Since the one-stage pulley tackle 19-20 has a transmission ratio equaling 2, the displacement of board 12 is twice longer than that of the supplementary carriage 16.

The displacement value of the working carriage 14 depends on the angle $\alpha$ of bar 17.

Thus, the displacement of board 12 will be multiplied relative to the displacement of the working carriage 14 with blank 15, and the scale of multiplication will depend only on angle $\alpha$ of bar 17.

The scale of multiplication of the angular movement of pickup 3 relative to that of the electrode-tool 5 is determined by the simple ratio of the arms of tool 5 and pickup 3 with respect to the rotation axis 2.

Thus, the combined displacement in both coordinates, i.e. displacements of traverse 1 with pickup 3 and the electrode-tool 5, of board 12 with drawing 13, and of the working carriage 14 with blank 15, results in that each point of the line of drawing 13 continuously passes under the axis of pickup 3.

At the same time the wire electrode-tool 5 cuts out by electric erosion a reduced copy of the drawn master-form 13 from the blank.

What we claim is:

1. A copying system for electroerosion cutting of articles of complex shape in electroerosion machines by the method of using a wire electrode-tool that copies the lines of an enlarged drawing, comprising: a board to fix said drawing; a first carriage to fix said board; a second carriage to mount the working table of the machine with the job; a pickup to trace the lines of the drawing, which is disposed over said board; a tracing system electrically connected with said pickup and having two drives, one of which moves in a mutual proportion said first and second carriages; a traverse at one end of which said pickup is mounted, and connected to which is said electrode-tool of the machine; a pivot of said traverse passing through its other end, and about which said traverse swings while the article is being cut out, said traverse being driven by said second drive of the tracing system; a third carriage moved by said first drive of the tracing system; a flexible tie by which said third carriage is connected to said first carriage, to transmit motion to the latter; a sine converter located on said third carriage and capable of regulating its angle of inclination, which interacts with said second carriage.

* * * * *